United States Patent
Ubale et al.

(10) Patent No.: US 11,752,911 B1
(45) Date of Patent: Sep. 12, 2023

(54) OCCUPANT SUPPORT WITH FOLDABLE HEADREST

(71) Applicant: Faurecia Automotive Seating, LLC, Auburn Hills, MI (US)

(72) Inventors: Sachin Ubale, Troy, MI (US); Alex Giuro, Rochester Hills, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 17/727,016

(22) Filed: Apr. 22, 2022

(51) Int. Cl.
| | | |
|---|---|---|
| *B60N 2/20* | (2006.01) | |
| *B60N 2/853* | (2018.01) | |
| *B60N 2/30* | (2006.01) | |
| *B60N 2/874* | (2018.01) | |
| *B60N 2/856* | (2018.01) | |
| *B60N 2/832* | (2018.01) | |

(52) U.S. Cl.
CPC ............... *B60N 2/853* (2018.02); *B60N 2/20* (2013.01); *B60N 2/3011* (2013.01); *B60N 2/3065* (2013.01); *B60N 2/832* (2018.02); *B60N 2/856* (2018.02); *B60N 2/874* (2018.02)

(58) Field of Classification Search
CPC ........ B60N 2/856; B60N 2/874; B60N 2/832; B60N 2/853; B60N 2/3011; B60N 2/3065
See application file for complete search history.

(56) References Cited

U.S. PATENT DOCUMENTS

| | | | | |
|---|---|---|---|---|
| 6,364,414 B1* | 4/2002 | Specht | ................... | B60N 2/829 |
| | | | | 297/216.13 |
| 6,485,096 B1* | 11/2002 | Azar | ..................... | B60N 2/853 |
| | | | | 297/408 |
| 6,860,564 B2* | 3/2005 | Reed | ........................ | B60N 2/34 |
| | | | | 297/378.12 |
| 7,118,171 B2 | 10/2006 | Fowler | | |
| 7,523,987 B2* | 4/2009 | Yamaguchi | ............ | B60N 2/888 |
| | | | | 297/216.12 |
| 7,644,982 B2* | 1/2010 | Paluch | ................... | B60N 2/203 |
| | | | | 297/94 |
| 7,967,375 B2* | 6/2011 | Yu | ........................ | B60N 2/3075 |
| | | | | 297/15 |
| 8,056,954 B2 | 11/2011 | Homier | | |
| 8,061,777 B2* | 11/2011 | Jensen | ..................... | B60N 2/20 |
| | | | | 297/378.12 |
| 8,066,326 B2* | 11/2011 | Hurst, III | ............... | B60N 2/856 |
| | | | | 297/321 |

(Continued)

*Primary Examiner* — Syed A Islam
(74) *Attorney, Agent, or Firm* — BARNES & THORNBURG LLP (57) ABSTRACT

An occupant support includes a seat bottom, a seat back, and a cam. The seat bottom includes a side frame member. The seat back includes a headrest configured to fold about a headrest fold axis. The side frame member is rotatably coupled to the seat back and configured to rotate relative to the seat back about a side frame rotation axis. The cam is coupled to the side frame member and coupled to the headrest such that rotation of the cam causes the headrest to rotate about the headrest fold axis. Rotation of the cam about the side frame rotation axis relative to the seat back causes the cam to pull a connecting member which causes the headrest to rotate about the headrest fold axis to a folded position. The rotation of the headrest about the headrest fold axis occurs during the occupant support folding movement.

20 Claims, 5 Drawing Sheets

(56) References Cited

U.S. PATENT DOCUMENTS

| | | | | |
|---|---|---|---|---|
| 8,123,272 | B2* | 2/2012 | Ito | B60N 2/3011 |
| | | | | 296/65.09 |
| 8,662,578 | B2* | 3/2014 | Szybisty | B60N 2/36 |
| | | | | 297/378.12 |
| 8,672,399 | B2* | 3/2014 | Brunner | B60N 2/3011 |
| | | | | 297/61 |
| 8,864,209 | B2 | 10/2014 | White | |
| 9,475,416 | B2* | 10/2016 | DeForest | B60N 2/874 |
| 9,663,002 | B2* | 5/2017 | Lee | B60N 2/68 |
| 10,406,956 | B2* | 9/2019 | White | B60N 2/3075 |
| 10,800,304 | B2* | 10/2020 | Zhao | B60N 2/0252 |
| 11,124,100 | B1* | 9/2021 | Kangane | B60N 2/015 |
| 2011/0163574 | A1* | 7/2011 | Tame | B60N 2/853 |
| | | | | 297/61 |
| 2013/0093218 | A1* | 4/2013 | Yetukuri | B60N 2/859 |
| | | | | 297/311 |
| 2017/0113578 | A1* | 4/2017 | Shiraishi | B60N 2/80 |
| 2020/0001742 | A1* | 1/2020 | Epaud | B60N 2/809 |

\* cited by examiner

OCCUPANT SUPPORT WITH FOLDABLE HEADREST

BACKGROUND

The present disclosure relates to occupant supports, and particularly to occupant supports for vehicles. More particularly, the present disclosure relates to occupant supports with folding headrests.

SUMMARY

According to the present disclosure, an occupant support includes a seat bottom, a seat back, and a cam. The seat bottom includes a side frame member extending upwardly and rearwardly away from the seat bottom. The seat back is coupled to the seat bottom at a rearward end of the seat bottom and is arranged to extend upwardly away from the seat bottom. The seat back includes a headrest at the top of the seat back. The seat back is configured to fold relative to the seat bottom about a seat back fold axis, and the headrest is configured to fold about a headrest fold axis spaced apart from the seat back fold axis. The side frame member is rotatably coupled to the seat back and configured to rotate relative to the seat back about a side frame rotation axis.

The cam is coupled to the side frame member in a fixed position relative to the side frame member and coupled to the headrest such that rotation of the cam relative to the headrest causes the headrest to rotate about the headrest fold axis. The cam is coupled to the headrest via a connecting member. During an occupant support folding movement, the side frame member and the seat bottom move forwardly and downwardly relative to the seat back fold axis, the seat back rotates in a first rotational direction about the seat back fold axis, and the side frame member and the cam rotate in a second rotational direction opposite the first rotational direction about the side frame rotation axis. The rotation of the cam in the second rotational direction about the side frame rotation axis relative to the seat back causes the cam to pull the connecting member which causes the headrest to rotate about the headrest fold axis in the first rotational direction to a folded position. The rotation of the headrest about the headrest fold axis occurs during the occupant support folding movement.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

A first embodiment of an occupant support 10 is shown in FIGS. 1A-6. The occupant support 10 for a vehicle (not shown) in accordance with the present disclosure includes a vehicle seat 20 having a seat bottom 22 and a seat back 25 having a headrest 27 and arranged to extend upwardly away from the seat bottom 22. A side frame member 29 extends upwardly and away from the seat bottom 22 and is rotatably coupled to a side surface of the seat back 25.

The seat back 25 is configured to fold about a seat back fold axis 39 and the headrest 27 is configured to fold about a headrest fold axis 27F. The occupant support 10 further includes a cam 40 coupled to the headrest 27 via a connecting member 37. During an occupant support folding movement, the seat back 25 folds forward about the axis 39, or in other words, rotates in a first rotational direction 50. In response to this movement the seat bottom 22 moves forwardly and downwardly relative to the axis 39, or in other words, rotates in the first rotational direction 50. Simultaneously, due to this movement of the seat back 25, the side frame member 29 rotates relative to the seat back 25 in a second rotational direction 52, which in turn rotates the cam 40 in the second rotational direction 52. The rotation of the cam 40 pulls the connecting member 37, which folds the headrest 27 as the seat back 25 moves from a starting position, as shown in FIG. 1A, to a partially folded position, as shown in FIG. 2A.

The occupant support 10 includes the vehicle seat 20, as shown in FIGS. 1A, 2A, 3A-3C, 5, and 6. The vehicle seat 20 is arranged in the vehicle as any one of the conventional vehicle seats in a vehicle. For example, the vehicle seat 20 may be the passenger side front seat, the driver side front seat, the passenger side rear seat, or the driver side rear seat. The vehicle seat 20 includes the seat bottom 22 and the seat back 25 and is configured to support an occupant of the vehicle seat 20. The seat bottom 22 is arranged to overlie a floor of the vehicle and is arranged generally parallel with the floor. The seat bottom 22 may be configured to raise and lower, as well as pivot, relative to the floor of the vehicle. The seat bottom 22 further includes at least one side frame member 29 that extends rearwardly and upwardly away from the rearward end of seat bottom 22, the side frame member 29 including a terminal end that is rotatably coupled to a side surface of the seat back 25. In some embodiments, the seat bottom 22 includes two side frame members 29 arranged on either side of the seat bottom 22. Moreover, the side frame member 29 may be formed with a seat bottom frame 23, e.g. as a single, monolithic component, or may be rigidly coupled to the seat bottom frame 23 in any manner known a person skilled in the art. As can be seen in detail in FIGS. 3A-3C, the seat bottom 22 is coupled to the seat back 25 via the side frame members 29, and not at the seat back fold axis 39. In another example, the seat bottom 22 is only coupled to the seat back 25 via the side frame members 29.

Figure 1A:
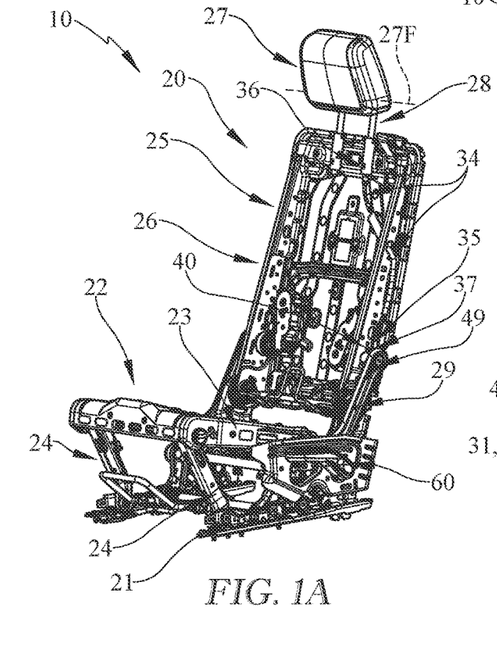
FIG. 1A is a perspective view of an occupant support according to the present disclosure, showing that the occupant support includes a seat bottom including a side frame member, a seat back, a headrest, and a cam fixedly coupled to the side frame member, and showing that, during an occupant support folding movement, the side frame member and the seat bottom move forwardly and downwardly relative to a seat back fold axis, the seat back rotates in a first rotational direction about the seat back fold axis, and the side frame member and the cam rotate in a second rotational direction opposite the first rotational direction about the side frame rotation axis such that the cam pulls on the headrest via a connecting member and folds the headrest.
Figure 1B:
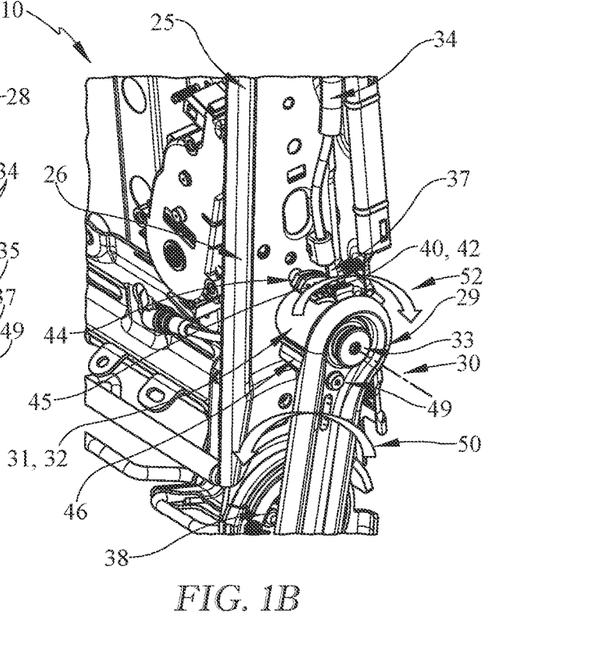
FIG. 1B is a magnified perspective view of the side frame member, the seat back, and the cam of FIG. 1A, showing that the connecting member extends upwardly away from the cam along the side of the seat back, showing that the cam is arranged on an outer surface of a rod extending between the side frame member and the seat back, and showing the first and second rotational directions.
Figure 2A:
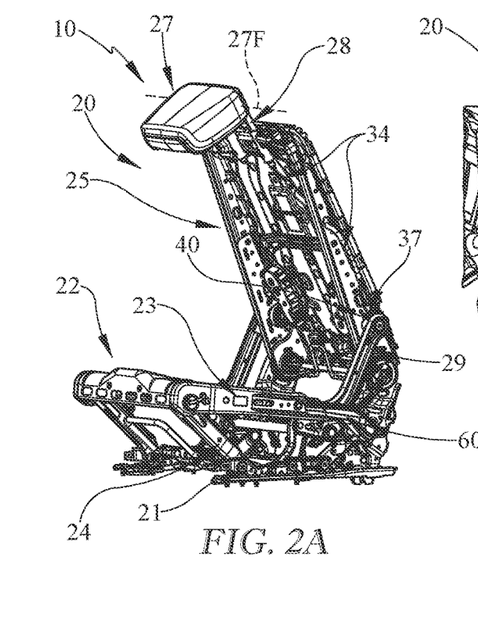
FIG. 2A is a perspective view of the occupant support of FIG. 1A, showing the occupant support partway through the occupant support folding movement, showing that the side frame member and the seat bottom have moved forward and downward relative to the seat back fold axis, showing that the seat back has rotated in the first rotational direction about the seat back fold axis, showing that the side frame member and the cam have rotated in the second rotational direction opposite the first rotational direction about the side frame rotation axis, and showing that the cam has pulled on the headrest via the connecting member to fold the headrest.
Figure 2B:
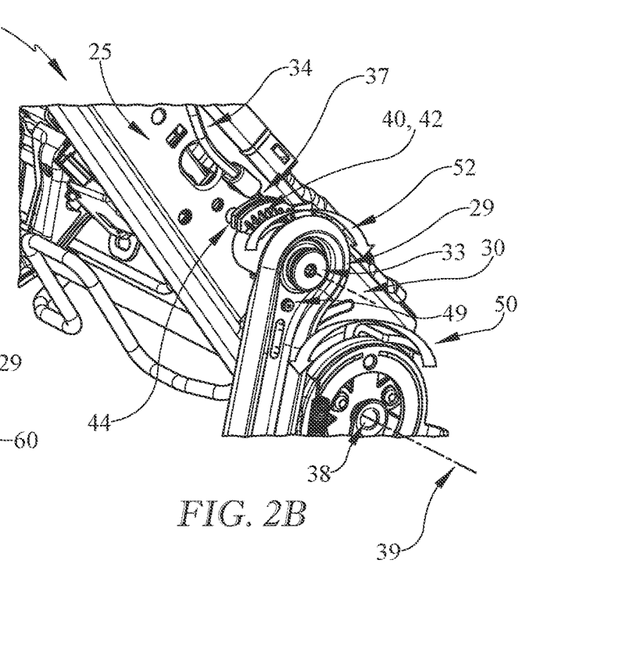
FIG. 2B is a magnified perspective view of the side frame member, the seat back, and the cam of FIG. 2A, showing that the cam has rotated in the second rotational direction and showing that the side frame member has rotated in the first rotational direction while having moved forwardly and downwardly.

In the illustrated embodiment, the occupant support 10 includes a foundation 21 and two support members 24 rotatably coupled to the foundation 21 and extending upwardly to support a forward end of the seat bottom 22, as shown in FIGS. 1A and 2A. The support members 24 are rotatably coupled to the forward end of the seat bottom 22 such that, when the occupant support is folded, in particular when the seat back 25 folds forward about the seat back fold axis 39, the two support members 24 also rotate forward about the support member axis 30. The support member axis 30 is arranged between the seat back fold axis 39 and the headrest fold axis 27F along a length of the seat back 25 as measured from the bottom to the top of the seat back 25.

Figure 3A:
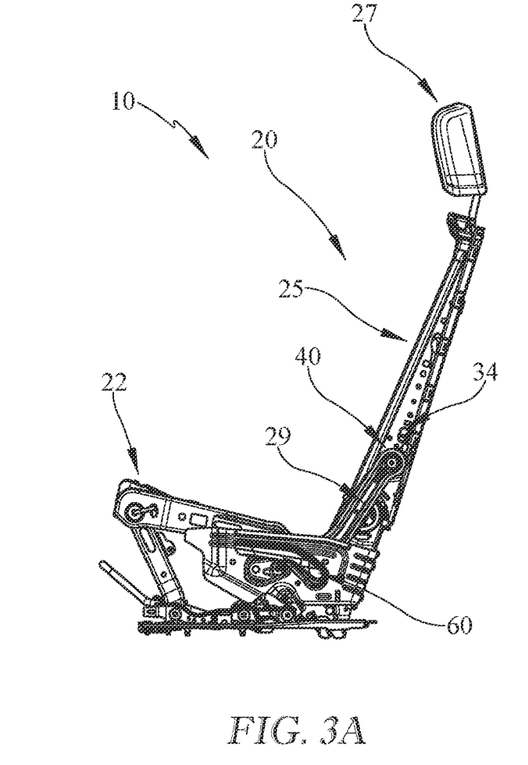
FIG. 3A is a side view of the occupant support of FIG. 1A, showing the occupant support in a starting position in which an occupant of the occupant support may comfortably rest.

In the illustrated embodiment, the forward end of the seat bottom 22 is arranged higher than the rearward end of the seat bottom 22 relative to the foundation 21 while in a starting position of the seat back 25 about the seat back fold axis 39, as shown in FIGS. 1A and 3A. The support members 24 are sized such that the rotation of the support members 24 causes the forward end of the seat bottom 22 to lower toward the foundation 21 faster than the rearward end of the seat bottom 22. In this way, the side frame member 29 moves with the forward folding movement of the seat back 25, and thus the side frame member 29 itself slightly rotates in the first rotational direction 50 during the occupant support folding movement.

The seat back 25 extends substantially vertically away from a rearward end of the seat bottom 22 and supports the back of the occupant of the vehicle seat 20 as shown in FIGS. 1A, 2A, 3A-3C, 5, and 6. The seat back 25 includes a seat back frame 26 that may support various additional components of the seat back such as cushions and the like. The frame 26 is formed from a rigid material and maintains the general shape of the seat back 25 when assembled. The headrest 27 extends upwardly out of a top surface of the seat back 25 via headrest supports 28 and is positioned to support the occupant's head. The headrest supports 28 may be formed as hollow, extendable tubes directly coupled to the seat back frame 26 and position the headrest 27 above the frame 26, and thus above the seat back 25. In the illustrated embodiment, the headrest 27 is configured to fold forward about the headrest fold axis 27F, which is defined at a connection joint between the headrest 27 and the headrest supports 28. As will described in greater detail below, the headrest 27 is folded by the pulling of the connecting member 37 on a forward side of the headrest 27.

Figure 3B:
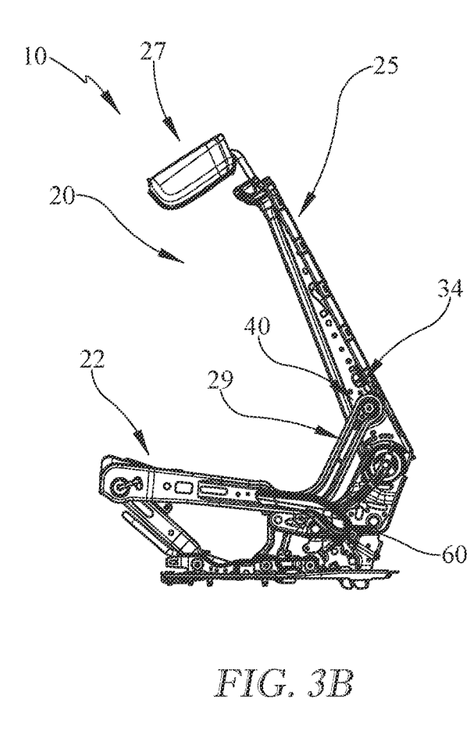
FIG. 3B is a side view of the occupant support of FIG. 2A, showing the occupant support in a partially folded position after the cam has pulled on the connecting member and folded the headrest.
Figure 3C:
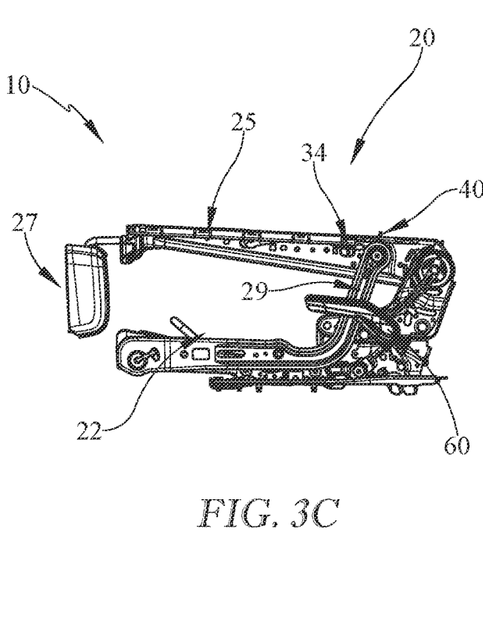
FIG. 3C is a side view of the occupant support of FIGS. 1A and 2A, showing the occupant support in a fully folded position.

The seat back 25 is configured to fold forward about the seat back fold axis 39. The foundation 21 may include a lever 60 coupled to the seat back 25 and/or the seat bottom 22, the lever 60 configured to unlock the occupant support 10 from a starting position, as shown in FIGS. 1A and 3A, to allow the occupant support 10 to enter the folding movement. The seat back 25 is configured to fold to a folded position as shown in FIG. 3C, as will be described in greater detail below.

The side frame member 29 is rotatably coupled to a side surface of the seat back frame 26 of the seat back 25, as shown in FIGS. 1A-6. The side frame member 29 includes a rod 31 that extends between and interconnects a terminal end of the side frame member 29 and the side surface of the seat back 26. The rod 31 may include a rod body 32 an outer end 33 that rotatably fits within an opening formed in the side frame member 29. The rod 31 may be formed as a cylinder which defines the side frame rotation axis 30 about which the side frame member 29 rotates relative to the seat back 25 as the seat back 25 folds forward.

Figure 6:
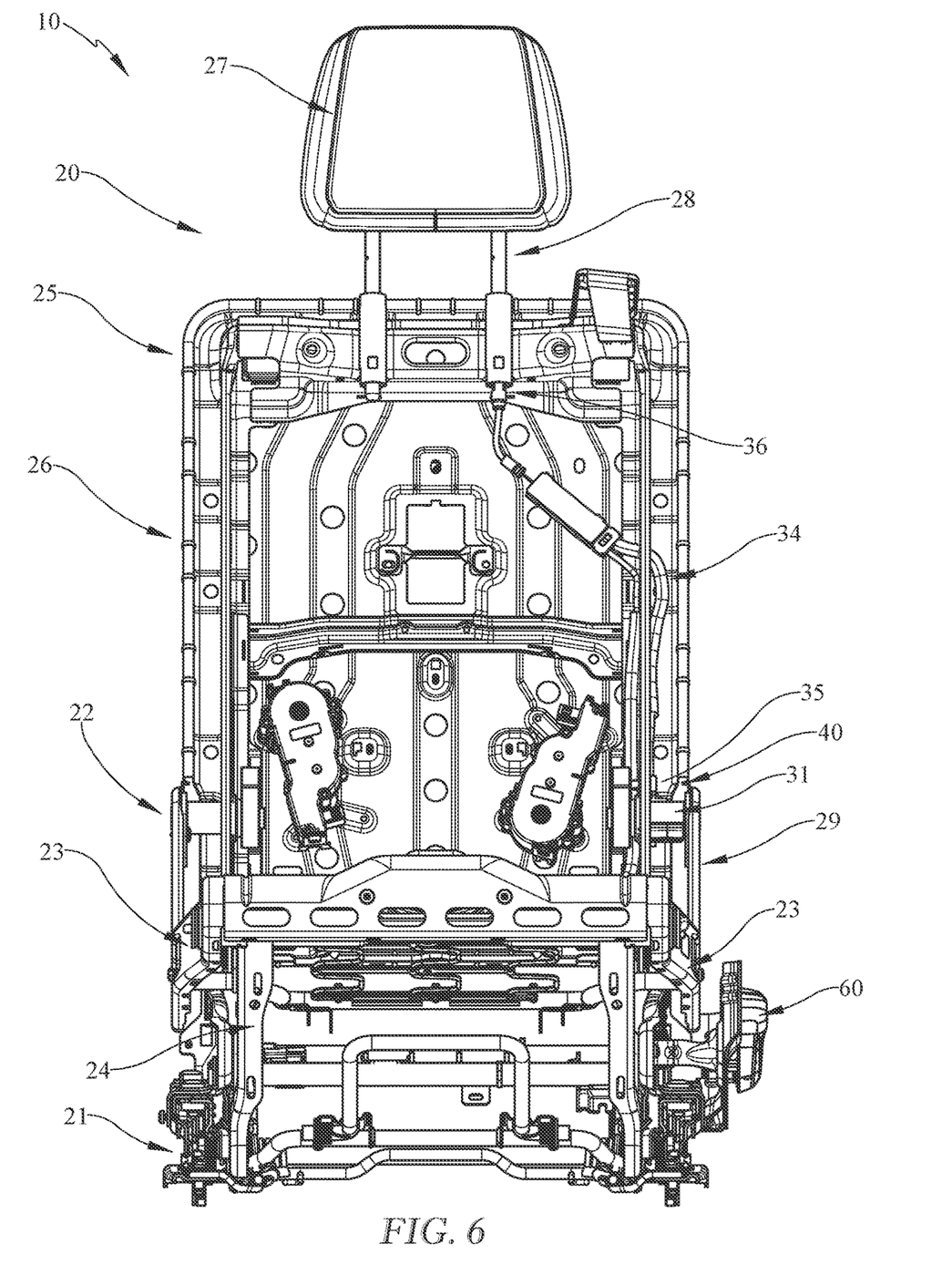
FIG. 6 is a front view of the occupant support of FIG. 1A.

The seat back 25 further includes a connecting member housing 34 that extends from an area adjacent to the rod 31 and the terminal end of the side frame member 29 to a bottom end of one of the headrest supports 28, as shown in FIGS. 1A, 2A, and 6. The housing 34 may be formed as a hollow tube 34 having a first end opening 35 located adjacent the rod 31 and a second end opening 36 located adjacent the headrest support 28. The housing 34 is configured to house the connecting member 37, which may be formed as a cable or similar component that extends from the cam 40 to the headrest 27. The housing 34 may extend along the side surface of the seat back frame 26 and then pass through the side surface and toward the headrest support 28.

The occupant support 10 further includes the cam 40 which is fixedly coupled to the side frame member 29, as shown in FIGS. 1A-4C and 6. The cam 40 is coupled to the headrest 27 via the connecting member 37 such that rotational movement of the cam 40 relative to the headrest 27 will cause the headrest 27 to fold. The cam 40 includes a cam body 42 that is arranged on an outer surface of the rod body 32. The cam body 42 may be formed as a circular body that extends around the outer surface of the cylindrical rod body 32. In the illustrated embodiment, the cam body 42 is formed to extend only partially around the outer surface of the rod body 32, but may extend entirely around the rod body 32 in other embodiments.

The cam body 42 further includes a pair of raised connecting member receiving walls 44 that extends away from the cam body 42 and is configured to at least partially surround the connecting member 37 during portions of the rotational movement of the cam 40, as shown in FIGS. 1B, 2B, and 4A-4C. The receiving walls 44 may extend around the outer surface of the cam body 42 and may be formed as two outwardly extending parallel walls between which the connecting member 37 is arranged. The connecting member 37 is coupled to a lower end of the cam 40 at an attachment point 41. The connecting member 37 extends around the cam body 42 between the receiving walls 44, outwardly from a top opening of the receiving walls 44, and into the connecting member housing 34. In some embodiments, the cam 40 may further include a plurality of ribs 45 that support at least one of the receiving walls 44.

Figure 4A:
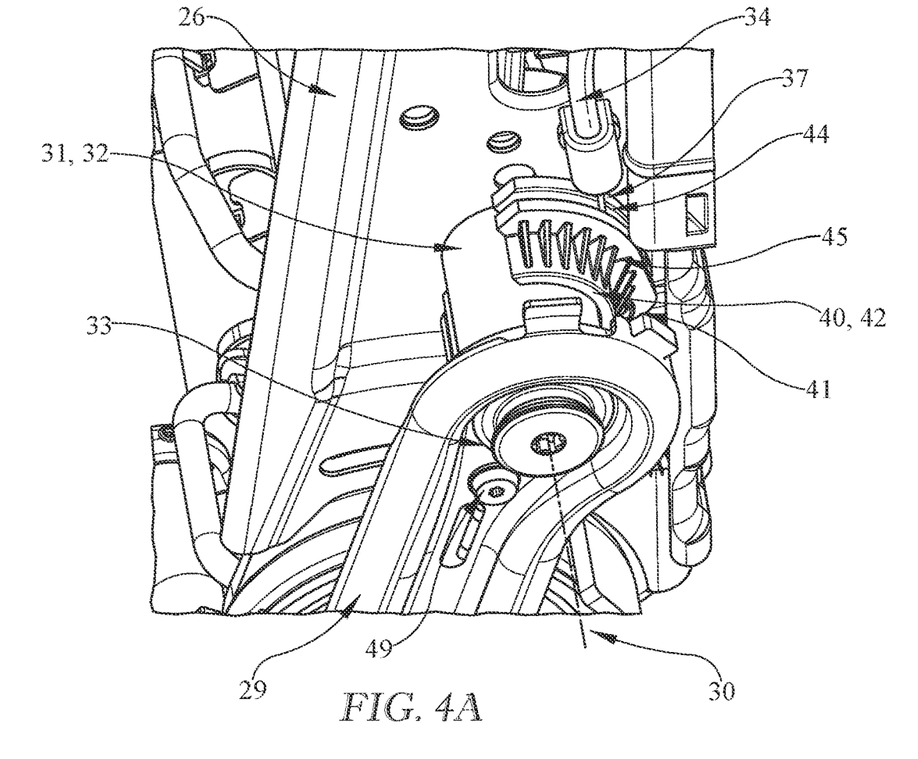
FIG. 4A is a magnified perspective view of the side frame member and cam of the occupant support of FIG. 3A, showing the side frame member and the cam positions while the occupant support is in the starting position of FIG. 3A.
Figure 4B:
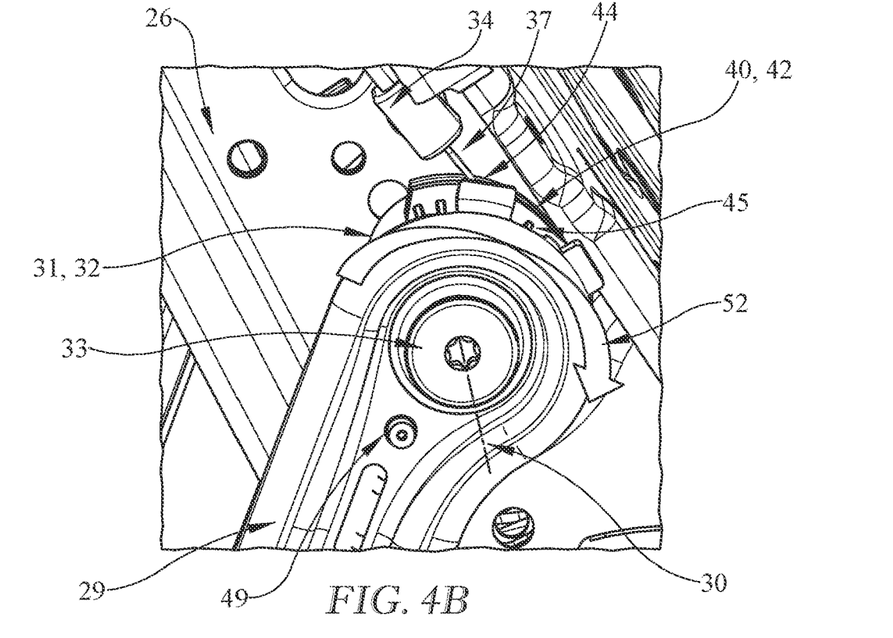
FIG. 4B is a magnified perspective view of the side frame member and cam of the occupant support of FIG. 3B, showing the side frame member and the cam positions while the occupant support is in the partially folded position of FIG. 3B.
Figure 4C:
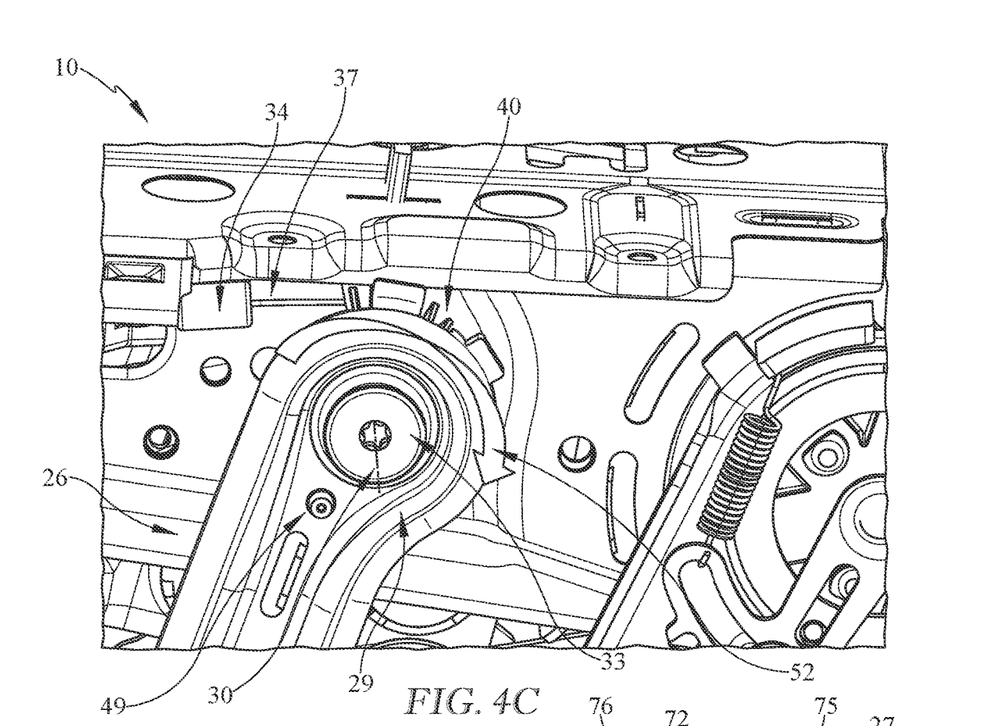
FIG. 4C is a magnified perspective view of the side frame member and cam of the occupant support of FIG. 3C, showing the side frame member and the cam positions while the occupant support is in the fully folded position of FIG. 3C.

In the illustrated embodiment, the cam 40 further includes a fastening member 49 that fixedly couples the cam 40 to the side frame member 29, as shown in FIGS. 1B, 2B, and 4A-4C. The fastening member 49 extends through the side frame member 29 and into the cam 40. As such, during an occupant support folding movement in which the lever 60 is pulled by an occupant to initiate the folding movement, the side frame member 29 and the seat bottom 22 move forwardly and downwardly relative to the seat back fold axis 39. The seat back 25 rotates in the first rotational direction 50 about the seat back fold axis 39. Because of the forward and downward rotational motion of the seat back 25, and because the side frame member 29 slightly rotates in the first rotational direction 50 as described above (from the forward and downward movement of the seat bottom 22), the side frame member 29 and the cam 40 rotate in the second rotational direction 52 about the side frame rotation axis 30. Thus, this rotation of the cam 40 in the second rotational direction 52 about the side frame rotation axis 30 relative to the seat back 25 causes the cam 40 to pull the connecting member 37, which in turn pulls the headrest 27 such that the headrest 27 rotates about the headrest fold axis 27F in the first rotational direction 50 to a folded position, as shown in FIGS. 2A, 3B, and 3C. The folding movement of the occupant support 10 is shown in greater detail in FIGS. 3A-3C, and the rotational movement of the cam 40 and the manner in which the cam 40 pulls the connecting member 37 is shown in FIGS. 4A-4C.

In the illustrated embodiment, the rotation of the headrest 27 about the headrest fold axis 27F occurs during at least a portion of the occupant support 10 folding movement, as shown in FIGS. 2A, 3A-3C, and 5. In particular, the cam 40, the connecting member 37, and the headrest 27 are configured such that the headrest 27 folding occurs during a particular period of the occupant support 10 folding movement. As can be seen in FIGS. 3A-3C, and in greater detail in FIG. 5, the rotation of the cam 40 in the second rotational direction 52 about the side frame rotation axis 30 causes the headrest 27 to begin to fold at a first rotational position 74 of the seat back 25 defined at a first rotational angle 76 about the seat back fold axis that is greater than 0 degrees in the first rotational direction 50. A vertical axis 72 extending upwardly away from the seat back fold axis 39 and perpendicular to a horizontal plane defined by the foundation 21 defines 0 degrees in the first rotational direction 50.

Figure 5:
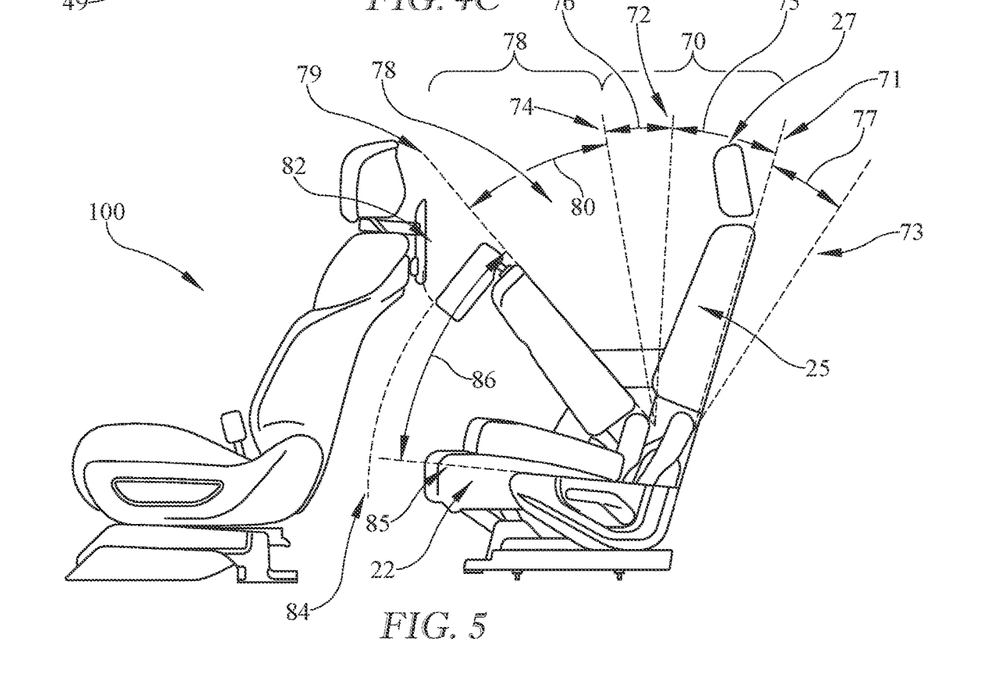
FIG. 5 is a side view of the occupant support of FIGS. 1A-3C and a further occupant support arranged forward of the occupant support, showing the various possible folding positions of the occupant support and showing when the headrest begins to fold during the folding movement.

In particular, the seat back 25 is arranged in a starting position 71 in which the occupant support 10 is in an upright position suitable for comfort during driving of the vehicle, as shown in FIGS. 3A and 5. The starting position 71 may be in a position defined by an angle 75 in a range from about −10 to about −20 degrees from the vertical axis 72. The term "about" as used herein refers to an angle within +/−2 degrees of the indicated value. The seat back 25 may also be reclined to a reclined position 73 defined by an angle 77 that is in a range from about −10 to about −70 degrees from the starting position 71. The portion of the folding movement of the occupant support 10 in which the headrest 27 does not fold is defined as a locked window 70 of the movement, as shown in FIG. 5.

The first rotational position 74 at which the headrest begins to fold may be defined at a first rotational angle 76 that is in a range of about 5 degrees to about 20 degrees in the first rotational direction away from the vertical axis 72, as shown in FIG. 5. The headrest 27 must complete the folding movement by the second rotational position 79 defined by an angle 80 that is in a range of about 15 degrees to about 30 degrees. In some embodiments, the headrest begins to fold at a first rotational angle 76 that is 20 degrees away from the starting position 71, and must complete the folding by the second rotational position 79 defined by the angle 80 that is 38 degrees from the starting position 71. The second rotational position 79 defines a point at which the headrest 27 must be folded so as to not contact the further occupant support 100 arranged in front of the occupant support 10. The area in which the headrest 27 may be folded may be referred to as a folding window 78. The path 82 of the folding of the headrest 27 about the headrest fold axis 27F and the path 84 of the folding of the headrest 27 after it has been folded are both shown in FIG. 5.

The seat back 25 is configured to rotate to an entirely folded position at a third rotational position 85 defined at a third rotational angle 86, as shown in FIGS. 3C and 5. As such, between the first rotational angle 76 (or the first rotational position 74) and the starting position 71, and between the second rotational angle 76 (or the second rotational position 79) and the third rotational angle 86 (or the third rotational position 85), the headrest 27 is locked and cannot fold about the headrest fold axis 27F. The headrest 27 must be folded in between the first rotational angle 76 (or the first rotational position 74) and the second rotational angle 76 (or the second rotational position 79) in order to avoid contacting the further occupant support 100, as well as to prevent premature folding of the headrest 27 that may obstruct the occupant. In the embodiment described above, the headrest 27 must be folded between 20 degrees and 38 degrees away from the starting position 71.

A method includes providing a seat bottom including a side frame member extending upwardly and rearwardly away from the seat bottom, and coupling a seat back to the seat bottom at a rearward end of the seat bottom and arranged to extend upwardly away from the seat bottom, the seat back including a headrest located in spaced apart relation above the seat bottom and a backrest located between the headrest and the seat bottom, the seat back configured to fold relative to the seat bottom about a seat back fold axis, the headrest configured to fold about a headrest fold axis spaced apart from the seat back fold axis, the side frame member rotatably coupled to the seat back and configured to rotate relative to the seat back about a side frame rotation axis.

The method further includes coupling a cam to the side frame member in a fixed position relative to the side frame member and coupling the cam to the headrest such that rotation of the cam relative to the headrest causes the headrest to rotate about the headrest fold axis, the cam being coupled to the headrest via a connecting member extending between and interconnecting the cam and the headrest. The folding of the seat back causes the side frame member and the seat bottom to move forwardly and downwardly relative to the seat back fold axis and the side frame member and the cam rotate in a second rotational direction opposite the first rotational direction about the side frame rotation axis, the rotation of the cam in the second rotational direction about the side frame rotation axis relative to the seat back causes the cam to pull the connecting member which pulls the headrest such that the headrest rotates about the headrest fold axis in the first rotational direction to a folded position. The rotation of the headrest about the headrest fold axis occurs during the occupant support folding movement.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. An occupant support comprising
   a seat bottom including a side frame member extending upwardly and rearwardly away from the seat bottom,
   a seat back coupled to the seat bottom at a rearward end of the seat bottom and arranged to extend upwardly away from the seat bottom, the seat back including a headrest located in spaced apart relation above the seat bottom and a backrest located between the headrest and the seat bottom, the seat back configured to fold relative to the seat bottom about a seat back fold axis, the headrest configured to fold about a headrest fold axis spaced apart from the seat back fold axis, the side frame member rotatably coupled to the seat back and configured to rotate relative to the seat back about a side frame rotation axis, and
   a cam coupled to the side frame member in a fixed position relative to the side frame member and coupled to the headrest such that rotation of the cam relative to the headrest causes the headrest to rotate about the headrest fold axis, the cam being coupled to the headrest via a connecting member extending between and interconnecting the cam and the headrest,
   wherein, during an occupant support folding movement, the side frame member and the seat bottom move forwardly and downwardly relative to the seat back fold axis, the seat back rotates in a first rotational direction about the seat back fold axis, and the side frame member and the cam rotate in a second rotational direction opposite the first rotational direction about the side frame rotation axis,
   wherein the rotation of the cam in the second rotational direction about the side frame rotation axis relative to the seat back causes the cam to pull the connecting member which causes the headrest to rotate about the headrest fold axis in the first rotational direction to a folded position, and
   wherein the rotation of the headrest about the headrest fold axis occurs during the occupant support folding movement.

2. The occupant support of claim 1, wherein the seat back defines a length extending from a top side of the seat back to a bottom side of the seat back located adjacent the seat bottom, and wherein the side frame rotation axis is located between the seat back fold axis and the headrest fold axis along the length of the seat back.

3. The occupant support of claim 2, further comprising
   a foundation supporting the seat bottom and defining a horizontal plane,
   wherein the rotation of the cam in the second rotational direction about the side frame rotation axis causes the headrest to begin to rotate about the headrest fold axis in the first rotational direction at a first rotational position of the seat back defined at a first rotational angle about the seat back fold axis that is greater than 0 degrees in the first rotational direction, and wherein a vertical axis extending upwardly away from the seat back fold axis and perpendicular to the horizontal plane defines 0 degrees in the first rotational direction.

4. The occupant support of claim 3, wherein the first rotational angle is in a range of about 5 degrees to about 20 degrees in the first rotational direction away from the vertical axis.

5. The occupant support of claim 4, wherein the seat back is configured to rotate to an entirely folded position at a second rotational position defined at a second rotational angle about the seat back fold axis, wherein, between the first rotational angle and the vertical axis and between the first rotational angle and the second rotational angle, the headrest is locked and cannot fold about the headrest fold axis.

6. The occupant support of claim 5, wherein the headrest is in a starting position between the first rotational angle and the vertical axis, and wherein the headrest is in the folded position between the first rotational angle and the second rotational angle.

7. The occupant support of claim 2, further comprising
   a foundation assembly including a foundation and at least one support member rotatably coupled to the foundation at a support member rotation axis, the at least one support member extending upwardly and rotatably coupled to a forward end of the seat bottom so as to support the forward end of the seat bottom, wherein the movement of the seat bottom forwardly and downwardly relative to the seat back fold axis during the occupant support folding movement causes the at least one support member to rotate in the first rotational direction about the support member rotation axis.

8. The occupant support of claim 7, wherein the forward end of the seat bottom is arranged higher than the rearward end of the seat bottom relative to the foundation in a starting position of the seat back about the seat back fold axis, and wherein the rotation of the at least one support member causes the forward end of the seat bottom to lower toward the foundation faster than the rearward end of the seat bottom such that the side frame member rotates in the first rotational direction during the occupant support folding movement.

9. The occupant support of claim 2, wherein the side frame member includes a rod that extends between and interconnects a terminal end of the side frame member and a side surface of the seat back.

10. The occupant support of claim 9, wherein the cam is arranged on an outer surface of the rod.

11. The occupant support of claim 10, wherein the cam is held in a fixed position relative to the side frame member via a fastening member that couples the cam to the side frame member.

12. The occupant support of claim 11, wherein the connecting member is a rigid cable that is coupled to the cam.

13. A method comprising
providing a seat bottom including a side frame member extending upwardly and rearwardly away from the seat bottom,
coupling a seat back to the seat bottom at a rearward end of the seat bottom and arranged to extend upwardly away from the seat bottom, the seat back including a headrest located in spaced apart relation above the seat bottom and a backrest located between the headrest and the seat bottom, the seat back configured to fold relative to the seat bottom about a seat back fold axis, the headrest configured to fold about a headrest fold axis spaced apart from the seat back fold axis, the side frame member rotatably coupled to the seat back and configured to rotate relative to the seat back about a side frame rotation axis,
coupling a cam to the side frame member in a fixed position relative to the side frame member,
coupling the cam to the headrest such that rotation of the cam relative to the headrest causes the headrest to rotate about the headrest fold axis, the cam being coupled to the headrest via a connecting member extending between and interconnecting the cam and the headrest, and
folding the seat back about the seat back fold axis toward the seat bottom in a first rotational direction, the folding of the seat back causing the side frame member and the seat bottom to move forwardly and downwardly relative to the seat back fold axis and the side frame member and the cam rotate in a second rotational direction opposite the first rotational direction about the side frame rotation axis, the rotation of the cam in the second rotational direction about the side frame rotation axis relative to the seat back causes the cam to pull the connecting member which pulls the headrest such that the headrest rotates about the headrest fold axis in the first rotational direction to a folded position,
wherein the rotation of the headrest about the headrest fold axis occurs during the occupant support folding movement.

14. The method of claim 13, wherein the seat back defines a length extending from a top side of the seat back to a bottom side of the seat back located adjacent the seat bottom, and wherein the side frame rotation axis is located between the seat back fold axis and the headrest fold axis along the length of the seat back.

15. The method of claim 14, wherein a foundation supports the seat bottom and defines a horizontal plane, wherein the rotation of the cam in the second rotational direction about the side frame rotation axis causes the headrest to begin to rotate about the headrest fold axis in the first rotational direction at a first rotational position of the seat back defined at a first rotational angle about the seat back fold axis that is greater than 0 degrees in the first rotational direction, and wherein a vertical axis extending upwardly away from the seat back fold axis and perpendicular to the horizontal plane defines 0 degrees in the first rotational direction.

16. The method of claim 15, wherein the first rotational angle is in a range of 5 degrees to 20 degrees in the first rotational direction away from the vertical axis.

17. The method of claim 16, wherein the seat back is configured to rotate to an entirely folded position at a second rotational position defined at a second rotational angle about the seat back fold axis, wherein, between the first rotational angle and the vertical axis and between the first rotational angle and the second rotational angle, the headrest is locked and cannot fold about the headrest fold axis.

18. The method of claim 17, wherein the headrest is in a starting position between the first rotational angle and the vertical axis, and wherein the headrest is in the folded position between the first rotational angle and the second rotational angle.

19. The method of claim 14, further comprising
providing a foundation assembly including a foundation and at least one support member rotatably coupled to the foundation at a support member rotation axis, the at least one support member extending upwardly and rotatably coupled to a forward end of the seat bottom so as to support the forward end of the seat bottom,
wherein the movement of the seat bottom forwardly and downwardly relative to the seat back fold axis during the occupant support folding movement causes the at least one support member to rotate in the first rotational direction about the support member rotation axis.

20. The method of claim 19, wherein the forward end of the seat bottom is arranged higher than the rearward end of the seat bottom relative to the foundation in a starting position of the seat back about the seat back fold axis, and wherein the rotation of the at least one support member causes the forward end of the seat bottom to lower toward the foundation faster than the rearward end of the seat bottom such that the side frame member rotates in the first rotational direction during the occupant support folding movement.

* * * * *